UNITED STATES PATENT OFFICE.

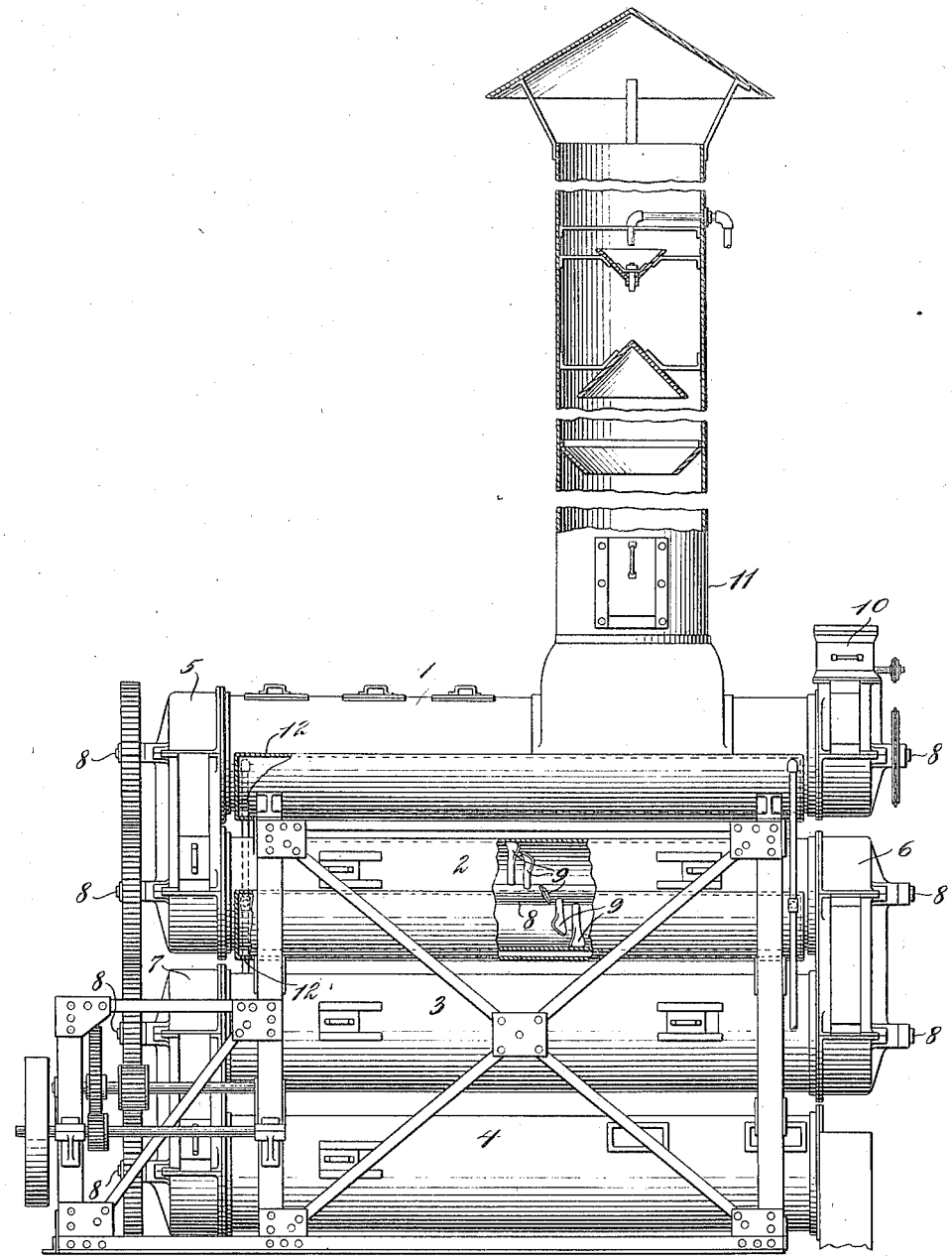

ALBERT ZIMMERMAN, OF BROOKLYN, NEW YORK, ASSIGNOR TO THE ESTATE OF LOWELL M. PALMER, DECEASED, FORMERLY OF BROOKLYN, NEW YORK.

METHOD OF SLAKING LIME.

1,255,268.      Specification of Letters Patent.      Patented Feb. 5, 1918.

Original application filed February 12, 1915, Serial No. 7,757. Divided and this application filed August 13, 1916. Serial No. 115,692.

*To all whom it may concern:*

Be it known that I, ALBERT ZIMMERMAN, a citizen of the United States, residing at the city of New York, in the borough of Brooklyn and State of New York, have invented certain new and useful Improvements in Methods of Slaking Lime, of which the following is a full, clear, and exact description.

My invention resides in an improved method of slaking lime.

I have discovered that, in the manufacture of hydrated lime, the best results are obtained only when complete hydration of the unslaked lime is effected. In order to accomplish complete hydration, it is necessary to use an excess of water, but this lowers the temperature of the hydrating zone of the apparatus below that which is essential to properly sustain the chemical reaction which takes place, and when the apparatus is thus chilled the resultant product is of inferior quality. According to my invention, I use an excess of water for slaking or hydrating and supply to the slaking zone of the hydrating apparatus, heat in addition to that produced by the reaction between the lime and water.

My improved method consists in supplying unslaked lime to an elongated container or chamber, supplying water to the lime in the container in quantities greatly in excess of the amount required for slaking, and applying additional heat to the slaking zone of the container to prevent the temperature thereof from falling below that required for proper slaking.

It also consists in certain features and details, which will be hereinafter more fully described and claimed.

One form of apparatus in which my improved method may be carried out has been illustrated in the accompanying drawings, in which the figure thereof is a sectional side elevation.

The apparatus illustrated is a modification of and improvement upon the apparatus disclosed in the patent to Kritzer, No. 932,789, dated August 31, 1909. The same consists of an elongated container or chamber in which the slaking and subsequent drying operations are carried out, the said container being made up of the horizontal drums 1, 2, 3 and 4, the drums 1 and 2 being connected to each other at one end by a fixed hood or chute 5, the drums 2 and 3 being connected to each other by a similar hood or chute 6 and the drums 3 and 4 being connected together by the fixed hood or chute 7, so that there is a continuous, closed, zig-zag passage through the apparatus, including each of the drums. Extending axially through the drums 1, 2, 3 and 4, are the shafts 8, the said shafts being geared to each other, as shown, so as to move alternately in opposite directions, and each of said shafts being provided with a series of stirring and advancing blades 9. The apparatus, as thus far described, corresponds with that disclosed in the Kritzer patent, and the operation of the various parts is the same. That is, the unslaked lime is delivered to the upper drum 1 through the feed hopper 10 and water is supplied in a finely divided condition through the stack 11, which communicates with the drum. The slaking zone of the apparatus is almost wholly within the drum 1, although some of the slaking may be performed after the material passes into the drum 2. Throughout the greater part of the drum 2 and in the drums 3 and 4 and their connected end portions, the slaked or hydrated lime is dried, so that when the same is delivered from the discharge end of the container, that is, from the drum 4, it is in the form of a dry powder.

I have found that an improved product may be obtained by adding to the unslaked lime in the slaking zone of the container, that is, in the drum 1, quantities of water greatly in excess of those required for slaking. In this way, complete and perfect hydration of the unslaked lime may be obtained, but as the addition of an excess of water tends to reduce the temperature of the container to a point below that which is essential to proper slaking, I supply additional heat to the slaking zone by surrounding the drum 1 with a steam jacket 12. One or more of the drums 2, 3, 4, may also be supplied with a similar steam jacket. Through these jackets a current of steam is passed, which not only prevents the temperature of the mass under treatment in the slaking zone of the apparatus from falling below that required for proper slaking, but when the drums 2, 3, etc. are provided with such steam jacket, assists in removing from the slaked lime the excess water which it contains, so that the final product will be a soft, dry, smooth, unstained, amorphous powder.

It will be understood, of course, that with the unslaked lime supplied to the apparatus through the hopper 10 and an excess of water supplied to the lime through the stack 11, the slaking operation takes place in the drum 1 and is almost, if not completely, finished within said drum. The mass under treatment is stirred and fed along through the apparatus by means of the blades 9 on the shafts 8, the same passing from the drum 1, through the hood 5 into the drum 2, thence through the hood 6 into the drum 3, and thence through the hood 7 into the drum 4, from which it is finally discharged. The passage through the apparatus is slow. The proper heat for the reaction between the water and the unslaked lime is maintained by the steam jacket around the drum 1, and all excess moisture, due to the excess of water employed in the slaking operation, is removed by the current of air passing through the apparatus from the discharge end, toward the stack, assisted by the heat from the steam jackets surrounding those portions of the apparatus below the drum 1.

I claim:

1. The process of hydrating lime which consists in feeding lime and in supplying water to the lime in excess of the amount required for slaking, passing a current of air over the lime and supplying heat from an external source to the lime and water in the slaking zone in addition to that which is created by the reaction between the lime and water, whereby a proper slaking temperature may be maintained with an amount of water present in excess of that required to slake the lime.

2. The process of hydrating lime which consists in feeding lime to an elongated closed chamber and passing said lime through said chamber, supplying the lime at one end of the closed chamber with water in excess of the amount required for slaking, passing a current of air through said closed chamber and supplying heat from an external source to the lime and water in the slaking zone in addition to that which is created by the reaction between the lime and water, whereby a proper slaking temperature may be maintained with an amount of water present in excess of that required to slake the lime.

3. The method of slaking lime in an elongated container, which consists in continuously supplying unslaked lime to said container, continuously supplying water to the lime in quantities greatly in excess of the amount required for slaking, continuously stirring the mass under treatment and feeding it through the container, and applying heat from an external source to the lime and water in the slaking zone of said container in addition to that which is created by the reaction between the lime and water to prevent the temperature of the lime and water from falling below that required for proper slaking.

4. The method of slaking lime in an elongated container, which consists in supplying unslaked lime to said container, supplying water to the lime in said container in quantities greatly in excess of the amount required for slaking, applying heat from an external source to the lime and water in the slaking zone of said container in addition to that which is created by the reaction between the lime and water to prevent the temperature of the lime and water from falling below that required for proper slaking, stirring the mass under treatment and feeding it through the container, and applying additional heat to the slaked lime while in the container after it passes from the slaking zone to remove excess of moisture therefrom.

5. The method of slaking lime in a series of containers, which consists in supplying unslaked lime in mass in the first of said series of containers, supplying water thereto greatly in excess of the amount required for slaking said mass, applying heat from an external source to the lime and water in said first container in addition to that which is created by the reaction between the lime and water to prevent the temperature of the lime and water from falling below that required for proper slaking, passing the treated mass successively to the other containers, and applying additional heat to said treated mass while in one or more of said other containers to remove excessive moisture from the slaked lime.

In witness whereof, I subscribe my signature.

ALBERT ZIMMERMAN.